United States Patent [19]

Ogawa et al.

[11] Patent Number: 4,512,807

[45] Date of Patent: Apr. 23, 1985

[54] AQUEOUS INK COMPOSITION FOR INK-JET PRINTING

[75] Inventors: Akira Ogawa; Toshiaki Asano, both of Kanagawa, Japan

[73] Assignee: Fuji Photo Film Co., Ltd., Japan

[21] Appl. No.: 467,671

[22] Filed: Feb. 17, 1983

[30] Foreign Application Priority Data

Feb. 17, 1982 [JP] Japan .................................. 57-24219

[51] Int. Cl.³ ............................................ C09D 11/02
[52] U.S. Cl. ...................................................... 106/22
[58] Field of Search ..................... 106/20, 22; 260/151

[56] References Cited

U.S. PATENT DOCUMENTS 3,310,552  3/1967  Ischer .................... 260/151
4,365,998 12/1982  Sugiyama et al. ........ 106/20
4,446,470  5/1984  Sugiyama ................ 106/22

FOREIGN PATENT DOCUMENTS 2121176  5/1970  Fed. Rep. of Germany .
 164170  4/1981  Japan .
7164170 10/1982  Japan .

Primary Examiner—Paul Lieberman
Assistant Examiner—Amelia B. Yarbrough
Attorney, Agent, or Firm—Sughrue, Mion, Zinn, Macpeak and Seas

[57] ABSTRACT

An aqueous ink composition is described which contains water-soluble dye dissolved in water, the dye comprising at least one water-soluble azo dye represented by formula (I)

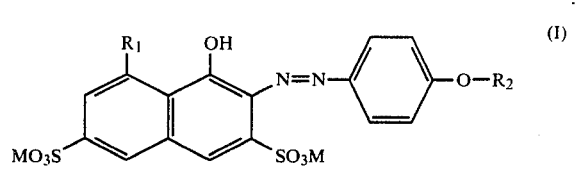

wherein $R_1$ represents an amino group, $R_2$ represents an alkyl group, and M represents a hydrogen atom, an alkali metal, an ammonium group or an organic amine group. The aqueous ink composition of the invention is suited for ink-jet printing.

6 Claims, 2 Drawing Figures

AQUEOUS INK COMPOSITION FOR INK-JET PRINTING

FIELD OF THE INVENTION

This invention relates to an aqueous ink composition for ink-jet printing. More particularly, the invention relates to an aqueous magenta ink composition having an improved hue of magenta color, which, when used in combination with yellow, cyan and black ink compositions for producing a color image, contributes to production of clear color images and the achievement of faithful color reproduction over an extended wavelength region. The invention also relates to an aqueous ink composition for ink-jet printing which can be consistently discharged without clogging the small nozzle of an ink-jet printer during prolonged continuous operation, and which does not form a solid deposit on the inner wall of the nozzle when the operation is resumed after a short or a long suspension.

BACKGROUND OF THE INVENTION

There are three typical systems for ink-jet printing. In one system ink is ejected in the form of droplets through a small nozzle (measuring usually several microns to several hundreds microns in diameter), and to each droplet is imparted a predetermined static charge by electrical signals, followed by electrostatic deflection of the droplets between high-voltage deflection plates to form a character, a figure, or the like on a recording medium according to a predetermined dot matrix. In a second system ink is drawn in the form of droplets through a small nozzle of the above-specified size under the electrostatic control of high-voltage plates, accelerated, and then deflected electrostatically between deflection plates to form letters or figures on a recording medium according to a predetermined dot matrix. In a third system ink droplets are ejected in response to electrical signals to form letters or figures on a recording medium according to a predetermined dot matrix.

That is to say, typical ink-jet printing systems consist basically of forming a letter or a figure on a recording medium by ejecting ink droplets through a small nozzle, which are electrically charged and controlled electrostatically, or by discharging ink droplets from a small nozzle in response to electrical signals.

Aqueous ink used in these systems for ink-jet printing typically comprises water as a vehicle, a hydrophilic organic solvent, a coloring dye, and other optional additives. With such ink, letters, figures, or pictures can be printed on various objects, such as plastics, metals, paper, cloth, and so on.

For recording letters, figures, or pictures on such objects using an ink-jet printing process, the aqueous ink must meet the following requirements:

(1) Requirements for providing uniform ink droplets through a small nozzle:
  (a) the ink should have a viscosity ranging from 1 to 10 cps at 20° C.;
  (b) the ink should have a surface tension of more than 20 dynes/cm; and
  (c) the ink should be homogeneous and comprised of uniformly sized particles.

(2) Requirements for providing good color in an image on a recording medium;
  (a) the ink should contain dyes that provide colors identical to those required in the final color image;
  (b) in the case of color reproduction according to the subtractive process, the ink preferably contains yellow, magenta, and cyan dyes which absorb light only in their respective desired spectral ranges, and desirably do not absorb light in other ranges;
  (c) the ink should provide a color image which is satisfactorily sharp, and does not spread on the recording medium;
  (d) the ink contains dyes that provide high chroma and color density on the recording medium, and does not change in hue during storage or after it is applied onto the recording medium to form a color image (that is, the ink should have excellent lightfastness);
  (e) the ink should contain dyes that have a water solubility high enough to provide an ink composition of high chroma and color density;
  (f) the ink should contain dyes that do not render the ink extremely viscous; and
  (g) the ink should contain dyes that have low crystallizability such that they do not crystallize or solidify during storage or on standing in the ink to form deposits that clog the nozzle.

(3) Requirements for providing a good image on a recording medium:
  (a) the ink droplets applied onto the recording medium penetrate thereinto rapidly and dry quickly enough to form a letter or a figure that does not lose shape;
  (b) the ink upon drying has water resisting property high enough to provide that the letters or figures formed do not dissolve in water; and
  (c) the ink has good tack (adherence) to the recording medium.

It is known that water-soluble dyes which can be used in inks for ink-jet printing include certain of those described in *Color Index*, published by The Society of Dyers and Colorists and the American Association of Textile Chemists and Colorists, as disclosed in published unexamined Japanese Patent Application Nos. 12105/72, 9905/76, 120678/80 and 46979/80. More specifically, as known examples of water-soluble dyes for the abovedescribed purpose, metnion may be made of those described in published unexamined Japanese Patent Application Nos. 146304/77, 115306/78, 89534/74, 43153/80, 53591/80, 145773/80, 78076/80, 50072/80, and 15622/75, and so on.

However, inks using these conventional dyes have somewhat unsatisfactory hue and low chroma, and the combination of yellow, magenta, and cyan ink compositions incorporating these dyes does not always provide a color image with faithful color reproduction. As a further disadvantage, ink using these dyes does not always have satisfactory characteristics in that it sometimes clogs the nozzle during continuous operation or when the operation is restarted after a short or a long suspension, or in that it provides an image that spreads on the recording medium.

SUMMARY OF THE INVENTION

Therefore, one object of this invention is to provide an aqueous magenta ink composition suitable for color ink-jet printing which is improved in its hue and the clearness of the image it provides.

Another object of this invention is to provide an improved aqueous magenta ink composition for ink-jet printing that forms color images having sufficient high density and clearness, and does not spread on the recording medium.

A further object of this invention is to provide an improved aqueous magenta ink composition for ink-jet printing that does not clog the nozzle of an ink-jet printer.

A still another object of this invention is to provide an aqueous magenta ink composition for ink-jet printing that is excellent in stability and does not cause agglutination or sedimentation of dyes, and does not change in such properties with the lapse of time.

These objects of this invention can be attained by using an aqueous ink composition or ink-jet printing which contains water-soluble dye dissolving in water, with said water-soluble dye comprising at least one water-soluble azo dye represented by formula (I)

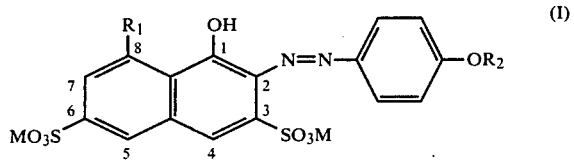

wherein $R_1$ represents an amino group (including substituted amino groups), $R_2$ represents an alkyl group (including substituted alkyl groups), and M represents a hydrogen atom, an alkali metal (such as sodium and potassium), an ammonium group or an organic amine group (such as pyridinium, triethylammonium and triethanolammonium).

In other words, the water-soluble dye used in this invention is characterized by having an aryl azo group at the 2-position of the H-acid or salt thereof and an ether bond against the para-position of the azo group.

DETAILED DESCRIPTION OF THE INVENTION

Figure 1:
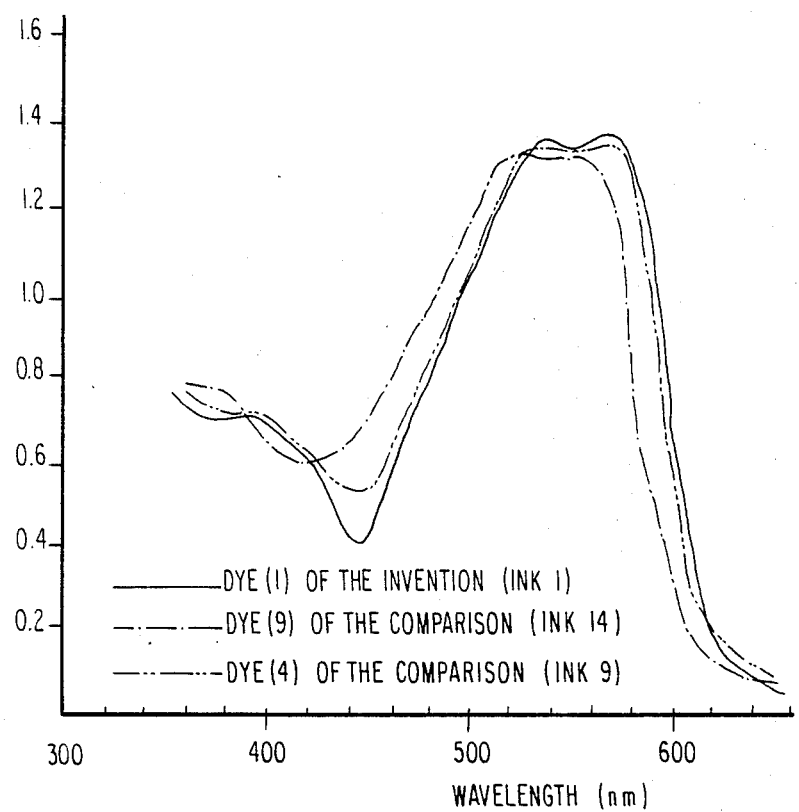
FIGS. 1 and 2 show spectral data of the inks of this invention and those of the comparison.

Examples of suitable substituents for the substituted amino group represented by $R_1$ in formula (I) include acyl groups (such as an alkylcarbonyl group containing from 1 to 6 carbon atoms (e.g., an acetyl group and a propionyl group), an alkenylcarbonyl group containing from 2 to 6 carbon atoms (e.g., a vinylcarbonyl group) and an arylcarbonyl group containing from 6 to 8 carbon atoms (e.g., a benzoyl group and a 2,5-dichlorobenzoyl group)), sulfonyl groups (such as an alkylsulfonyl group containing from 1 to 6 carbon atoms (e.g., a methanesulfonyl group), an alkenylsulfonyl group containing from 2 to 6 carbon atoms (e.g., a vinylsulfonyl group), an arylsulfonyl group containing from 6 to 8 carbon atoms (e.g., a benzenesulfonyl group and the like)), alkyl groups containing from 1 to 6 carbon atoms (such as a methyl group, an ethyl group and a propyl group), aryl groups containing from 6 to 8 carbon atoms (such as a phenyl group and a tolyl group), heterocyclic groups (such as a triazyl group) and so on. Examples of suitable substituents for the substituted alkyl group containing from 1 to 8 carbon atoms represented by $R_2$ include halogen atoms (such as a chlorine atom and a bromine atom), hydroxy groups, alkoxy groups containing from 1 to 4 carbon atoms (such as a methoxy group and an ethoxy group), cyano groups, carboxy groups, sulfo groups, phenyl groups, and so on.

The aqueous ink of this invention to be employed for ink-jet printing is characterized by the use of a novel water-soluble magenta dye.

Preferred examples of the water-soluble magenta dye to be used in this invention are those wherein $R_1$ in formula (I) is an amino group or a substituted amino group, the substituent of which is an acyl group, an alkyl group containing from 1 to 4 carbon atoms, or a phenyl group, and $R_2$ is an alkyl group containing from 1 to 4 carbon atoms, or a substituted alkyl group, the alkyl moiety of which contains from 1 to 4 carbon atoms and the substituent of which is a hydroxy group, a chlorine atom, or a phenyl group.

A particularly preferred water-soluble dye to be used in this invention is represented by the following formula (II):

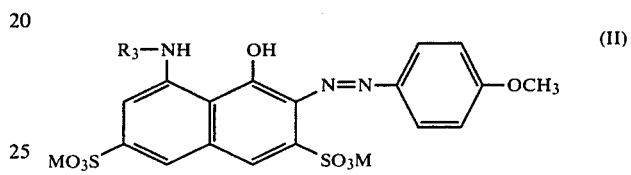

wherein $R_3$ is a hydrogen atoms, an acyl group (e.g., an acetyl group, a benzoyl group, or a substituted benzoyl group (the substituent moiety of which is a chlorine atom, a methyl group, a methoxy group, etc.)), or a sulfonyl group such as an alkylsulfonyl group (e.g., a methanesulfonyl group), an arylsulfonyl group (e.g., a benzenesulfonyl group) and an alkenylsulfonyl group (e.g., a vinylsulfonyl group); and M is the same as defined above. In preferred embodiments, the sulfo groups in formula (II) may be in the form of the alkali metal salt.

Some examples of water-soluble dyes which can be incorporated in the ink composition according to this invention are illustrated below, but it is to be understood that the dyes employable in this invention are by no means limited to these examples.

DYE EXAMPLES

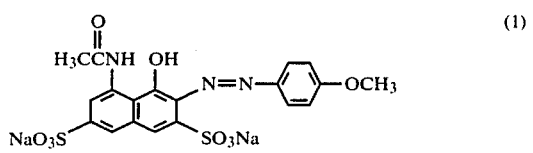

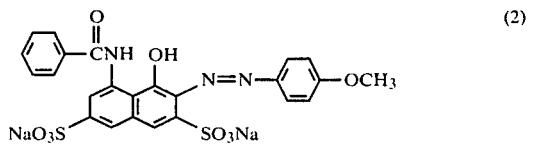

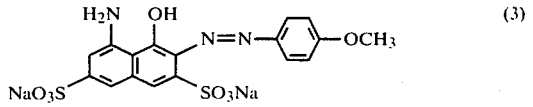

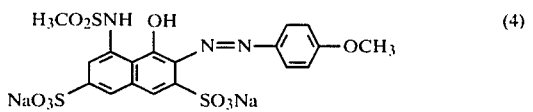

-continued (5) 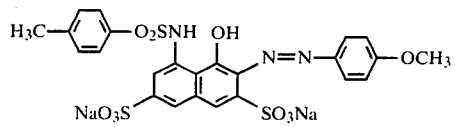

(6) 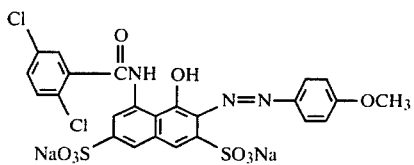

(7) 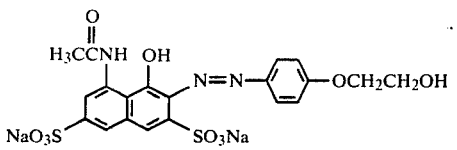

(8) 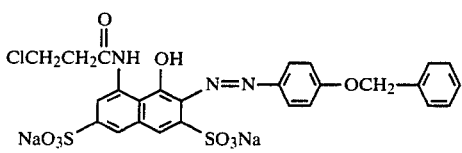

(9) 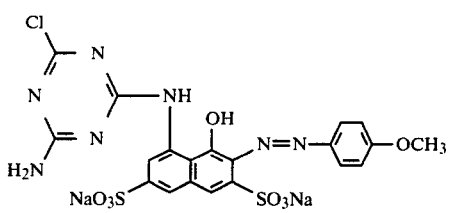

(10) 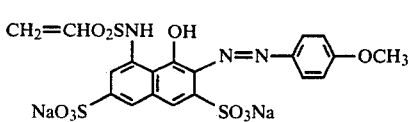

(11) 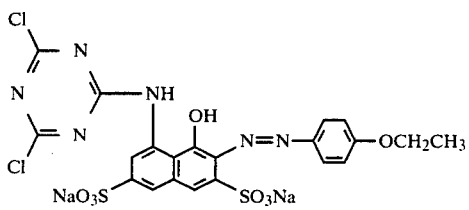

(12) 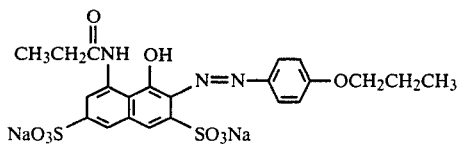

(13) 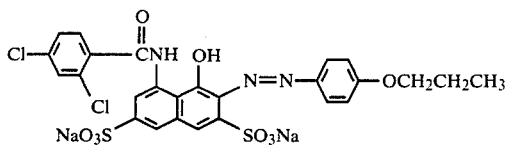

(14) 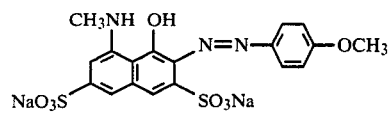

Syntheses of magenta dyes to be incorporated in the ink compositions of the present invention can be easily carried out according to generally known methods (as described in, for example, H. Horiguchi, *Sosetsu Gosei Senryo*, pp. 133–161, published by Sankyo Shuppan, Japan, published unexamined Japanese Patent Application 3497/80 and Japanese Patent Publication 28097/76). For instance, dyes represented by formula (II) can be synthesized by diazotizing

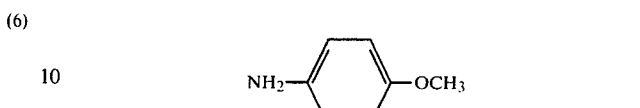

with sodium nitrite at a temperature of 0° to 10° C. in the presence of hydrochloric acid, and then adding

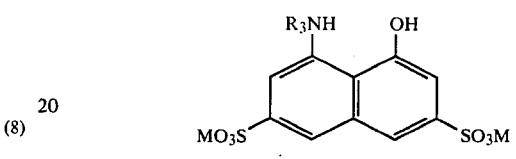

to the thus-prepared diazonium solution to conduct a coupling reaction as the pH value of the coupling system is maintained at a pH of from 9 to 11 by addition of an aqueous solution of sodium hydroxide and the temperature of the coupling system is maintained at from 10° to 15° C. until the coupling reaction is completed (typically from 1 to 5 hours).

The water-soluble dye is generally incorporated in an ink composition according to this invention in an amount of from 0.2 to 10 wt% based on the weight of the ink composition. If the dye is used in an amount of less than 0.2 wt%, it sometimes does not work as a coloring agent satisfactorily, and if it is used in an amount of more than 10 wt%, even though contained in a dissolved state just after the preparation, it may separate out of the solution as time goes by and form a precipitate that clogs the nozzle of an ink-jet printer.

In the ink composition of this invention, a wetting agent can also be incorporated. The wetting agent is added for the purposes of improvement in the resistance of the ink composition to drying prior to application to a printing medium, as a dissolution aid for the dye, etc. Preferred wetting agents are substantially nonvolatile at room temperature (about 20° C.), and a 10 to 20 wt% aqueous solution thereof has a surface tension of 20 dynes/cm or more, and preferably 30 dynes/cm or more, and a viscosity of 10 cps or less at room temperature. Further, the preferred wetting agent can dissolve the above-described water-soluble dyes in proportions of 0.5 wt% or more to further increase the solubility in water of the dyes.

Preferred examples of wetting agents having the above-described properties include 2-pyrrolidones of the types described in published unexamined Japanese Patent Application Nos. 71423/75, 5127/76, and 137505/76; 1,3-dialkyl-2-imidazolidinones of the type described in published unexamined Japanese Patent Application No. 71768/80; carboxylic acid amide derivatives of the types described in published unexamined Japanese Patent Application Nos. 97620/74, 8031/76 and 8033/76; lactones as described in published unexamined Japanese Patent Application No. 48267/80; dioxyethylene sulfur compounds as described in published unexamined Japanese Patent Application No. 5129/76; alcohol amines of the type described in published unexamined Japanese Patent Application No. 52004/76; N-formyl-lactam derivatives of the type described in published unexamined Japanese Patent Application No. 31525/76; sulforan and its derivatives of the types described in published examined Japanese Patent Application No. 154381/81 and published unexamined Japanese Patent Application No. 90865/81; polyalkylene glycols and monoesters thereof of the types described in published examined Japanese Patent Application No. 40484/76, and published unexamined Japanese Patent Application Nos. 137506/76, 12909/79 and 145638/76; carbonates of the type described in published examined Japanese Patent Application No. 18628/81; monovalent or divalent alcohols such as 2-butine-1,4-diol, t-butyl alcohol, n-amyl alcohol and the like, as described in published unexamined Japanese Patent Application Nos. 46979/80 and 129310/76; dialkylsulfones of the type described in published unexamined Japanese Patent Application No. 50072/80; urea, thiourea and derivatives thereof of the types described in published unexamined Japanese Patent Application Nos. 8471/81, 88473/81, 2363/81 and 122876/81; dialkyl phosphate and dialkyl phosphite derivatives of the type described in published unexamined Japanese Patent Application No. 120678/80; N-vinylpyrrolidone oligomers of the types described in published examined Japanese Patent Application No. 14643/77 and published unexamined Japanese Patent Application No. 9905/76; hydantoin derivatives of the type described in published unexamined Japanese Patent Application No. 109264/81; cellulose derivatives like hydroxypropyl cellulose, and polyvinyl alcohol of the types described in published unexamined Japanese Patent Application No. 17840/75; polyoxyethylene sorbitan fatty acid esters, polyoxyethylene fatty acid esters and polyoxyethylene alkylphenyl ethers of the types described in published unexamined Japanese Patent Application No. 143602/75; and water-soluble alginates of the type described in published unexamined Japanese Patent Application No. 62005/79.

The amount of wetting agent used in this invention varies with the type of the agent, but is preferably within the range of from 0.2 to 30 wt% based on the weight of the ink composition. The wetting agents illustrated above may be used alone or in combination.

In the case of forming a color image using yellow, cyan and black inks in addition to the magenta ink of this invention according to the subtractive process, such dyes described in the above-mentioned *Color Index* can be employed as water-soluble dye to be incorporated in the ink. More specifically, examples of yellow water-soluble dyes that can be incorporated in the ink composition include dyes of the types described in published unexamined Japanese Patent Application Nos. 89811/79, 16245/79 and 89534/74, as well as direct dyes, acid dyes and reactive dyes, such as C.I. Direct Yellow-27, -28, -33, -39, -58, -86, and -100, C.I. Acid Yellow-17, -19, -25, -29, -38, -49, -59, -61, -72, -111, -114, and -116, C.I. Reactive Yellow-1, -2, -3, -13, -14, -15 and -17.

Examples of cyan water-soluble dyes that can be incorporated in the ink composition include dyes of the types described in published unexamined Japanese Patent Application Nos. 89811/79, 12008/77, and 89534/74, as well as direct dyes, acid dyes and reactive dyes, such as C.I. Direct Blue-1, -8, -71, -76, -78, -80, -86, -90, -106, -108, -123, -163 and -165, C.I. Acid Blue-29, -126, -171, -175 and -183, and C.I. Reactive Blue-7, -14, -15, -18, -21 and -25.

Examples of black water-soluble dyes for use in black ink include dyes of the types described in published unexamined Japanese Patent Application Nos. 15622/75, 17840/75, 49004/75, 5127/76, 5128/76, 52004/76, 137506/76, 61412/78 and 77706/78, and published examined Japanese Patent Application No. 16243/79, as well as direct dyes and acid dyes, such as C.I. Direct Black-19, -38, -71, -74, -75, -112 and -117, and C.I. Acid Black-1, -24, -26, -48, -52, -58, -60, -107, -109, -119, -131, and -155.

The aqueous ink composition of this invention can also contain additives such as a mold inhibitor and an oxygen absorber. Examples of useful mold inhibitors include sodium dehydroacetate of the type described in published unexamined Japanese Patent Application No. 12008/77; 1,2-benzisothiazoline-3-one of the type described in published unexamined Japanese Patent Application No. 12009/77; 6-acetoxy-2,4-dimethyl-m-dioxane of the type described in published unexamined Japanese Patent Application Nos. 12010/77 and 96105/77; formalin and pentachlorophenol sodium of the type described in published unexamined Japanese Patent Application No. 15622/75; sodium benzoate of the type described in published unexamined Japanese Patent Application No. 30019/76; and citric acid salt of 8-quinolinol of the type described in published unexamined Japanese Patent Application 135707/78.

Examples of oxygen absorbers which can be used include sulfites such as sodium sulfite and sodium hydrogensulfite of the types described in published unexamined Japanese Patent Application Nos. 74406/77 and 61412/77, and D-glucose and L-ascorbic acid of the types described in published unexamined Japanese Patent Application No. 24472/81.

The ink composition of this invention may further contain a surface tension modifier. Examples of the surface tension modifier which can be employed include anionic surface active agents (e.g., sodium alkylsulfates, sodium alkylbenzenesulfonate, etc.), cationic surface active agents (e.g., alkylpyridinium sulfates, etc.), nonionic surface active agents (e.g., polyoxyethylene alkyl ethers, etc.), and amphoteric surface active agents.

The aqueous ink composition of this invention may be used in any type of ink-jet printer. For example, printers of the charge control type as described in U.S. Pat. No. 3,298,030, printers of the pulsating pressure type as described in U.S. Pat. No. 3,747,120 and so on, can be used.

Examples of a recording medium to which the ink composition of this invention may be applied include paper, cloth, film base, etc. As for the paper, no particular restrictions are placed thereon, and any kind of paper which has been used in general ink-jet printing can be employed. However, when a so-called coated paper, which is prepared by coating a clay layer, a gelatin layer, or the like on paper, is used, more preferable results can be obtained. For details of the coated paper descriptions in, e.g., published unexamined Japanese Patent Application Nos. 14472/80 and 146786/80 can be referred to.

The aqueous ink composition of this invention can be applied not only to ink-jet printing, but also for writing means such as a felt pen, a fountain pen, and so on, stamps, and recorders, provided that various properties are properly adjusted so as to satisfy their respective purposes of use.

This invention is now described in greater detail by reference to the following examples. In the examples, all parts are by weight.

EXAMPLE 1

Formulation of Ink 1 (This Invention)

| | parts |
|---|---|
| Dye Example (1) | 1.8 |
| N—Methyl-2-pyrrolidone | 15.0 |
| Diethylene Glycol | 2.0 |
| Triethanolamine | 2.0 |
| Water | 79.2 |

A blend of the formulation indicated above was heated at 30° to 40° C. with stirring for 1 hour, and the resulting mixture was passed through a micro-filter of FM type (a product of Fuji Photo Film Co., Ltd.; a mean pore diameter: 0.8 μm, diameter: 47 mm) at a pressure of 3 kg/cm² to prepare the intended ink composition.

Similarly, ink compositions 2 to 5 of this invention were prepared using blends of the formulations indicated below.

EXAMPLE 2

Formulation of Ink 2 (This Invention)

| | parts |
|---|---|
| Dye Example (1) | 1.8 |
| Thiodiglycol | 15.0 |
| Diethylene Glycol Monoethyl Ether | 2.0 |
| Triethanolamine | 2.2 |
| Water | 79.0 |

EXAMPLE 3

Formulation of Ink 3 (This Invention)

| | parts |
|---|---|
| Dye Example (2) | 2.0 |
| 1,3-Dimethoxymethyl-2-imidazolidinone | 15.0 |
| Thioglycol | 5.0 |
| Diethylene Glycol | 2.0 |
| Triethanolamine | 1.0 |
| Water | 75.0 |

EXAMPLE 4

Formulation of Ink 4 (This Invention)

| | parts |
|---|---|
| Dye Example (4) | 2.0 |
| N—Methyl-2-pyrrolidone | 10.0 |
| Sulforan | 5.0 |
| Triethanolamine | 1.0 |
| Water | 82.0 |

EXAMPLE 5

Formulation of Ink 5 (This Invention)

| | parts |
|---|---|
| Dye Example (7) | 2.0 |
| N—Methyl-2-pyrrolidone | 10.0 |
| N—Hydroxyethylactamide | 5.0 |
| Nonionic Surface Active Agent | 0.1 |

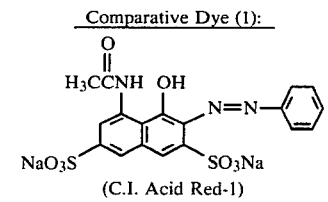

(z = about 10)

| | |
|---|---|
| Triethanolamine | 1.0 |
| Water | 81.9 |

Ink compositions for the purpose of comparison were prepared using conventionally known dyes illustrated below.

Comparative Dye (1):

(C.I. Acid Red-1)

Comparative Dye (2):

(C.I. Acid Red-108)

Comparative Dye (3):

(C.I. Acid Red-110)

Comparative Dye (4):

(C.I. Acid Violet-12)

Comparative Dye (5):

Comparative Dye (6):

-continued

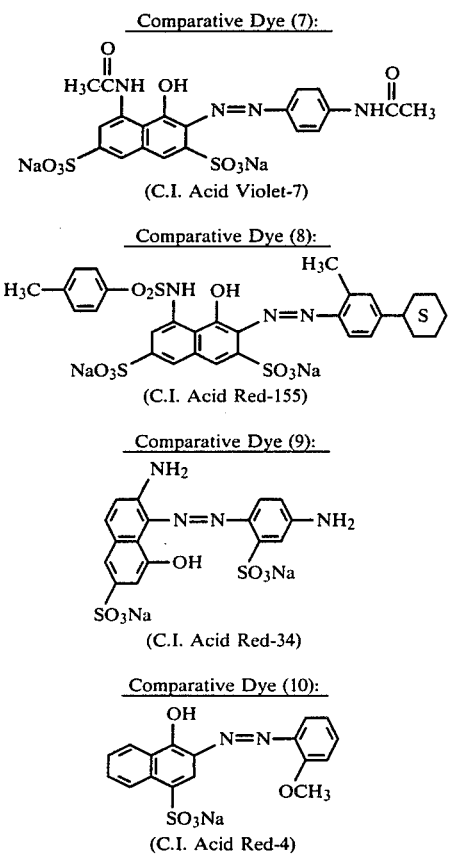

Comparative Dye (7):
(C.I. Acid Violet-7)

Comparative Dye (8):
(C.I. Acid Red-155)

Comparative Dye (9):
(C.I. Acid Red-34)

Comparative Dye (10):
(C.I. Acid Red-4)

Preparation of Comparative Ink Compositions

Comparative ink compositions 6 to 15 were prepared by repeating the procedure of Example 1 except that Dye Example (1) was replaced by 1.8 parts of Comparative Dyes (1) to (10), respectively.

Production of Recording Paper

10 Parts of LBKP (hardwood bleached kraft pulp) was beaten until the freeness CSF became 430 cc, and thereto were added 5 parts of talc, 1 part of saponified rosin and 2 parts of aluminum sulfate.18 hydrate ([Al($H_2O)_6$][$(SO_4)_3 \cdot 6H_2O$]). The thus-prepared material was used for manufacturing paper by means of a long screen type paper machine to provide a raw paper having a base weight of 100 g/m². When the paper was manufactured, oxidized starch was coated at a coverage of 2 g/m² as a solid component using a size press.

An aqueous coating solution containing 70 parts of synthetic zeolite, 30 parts of synthetic aluminum silicate, 0.3 part of sodium hexametaphosphate, 10 parts of casein, 10 parts of styrene-butadiene copolymer latex, 1 part of melamine resin and 2 parts of polyethylene glycol in the total proportion of 30% as solid components was prepared.

This coating solution was coated on the above-described raw paper at a coverage of 10 g/m² per one side as a solid component by means of an air knife coater, dried, and subjected to a super-calendering processing to give a recording paper.

TABLE 1

| Ink No. of Example and Comparative Example | Viscosity cps (25° C.) | Surface Tension dyne/cm (25° C.) | Storage Stability of Ink (1 month at 4° C.) | Image Quality | |
|---|---|---|---|---|---|
| | | | | Image Density | Hue |
| Ink 1 (This Invention) | 2.01 | 45.8 | Good | 1.36 | Sharp magenta |
| Ink 2 (This Invention) | 2.11 | 44.8 | Good | 1.36 | Sharp magenta |
| Ink 3 (This Invention) | 2.01 | 46.2 | Good | 1.38 | Sharp magenta |
| Ink 4 (This Invention) | 2.15 | 47.8 | Good | 1.40 | Sharp magenta |
| Ink 5 (This Invention) | 2.01 | 40.3 | Good | 1.41 | Sharp magenta |
| Ink 6 (Comparison) | 2.25 | 44.3 | Good | 1.31 | Red |
| Ink 7 (Comparison) | 2.31 | 45.1 | Good | 1.32 | Red |
| Ink 8 (Comparison) | 2.48 | 43.1 | Good | 1.31 | Reddish magenta |
| Ink 9 (Comparison) | 2.01 | 45.6 | Good | 1.33 | Reddish magenta |
| Ink 10 (Comparison) | 2.18 | 42.8 | Good | 1.34 | Reddish magenta |
| Ink 11 (Comparison) | 2.04 | 44.3 | Good | 1.32 | Bluish violet |
| Ink 12 (Comparison) | 2.16 | 45.0 | Good | 1.35 | Reddish magenta |
| Ink 13 (Comparison) | 2.58 | 43.0 | Dye precipitated | 1.32 | Red |
| Ink 14 (Comparison) | 2.18 | 44.3 | Good | 1.31 | Red |
| Ink 15 (Comparison) | 2.63 | 42.5 | Dye precipitated | 1.30 | Reddish orange |

Figure 2:
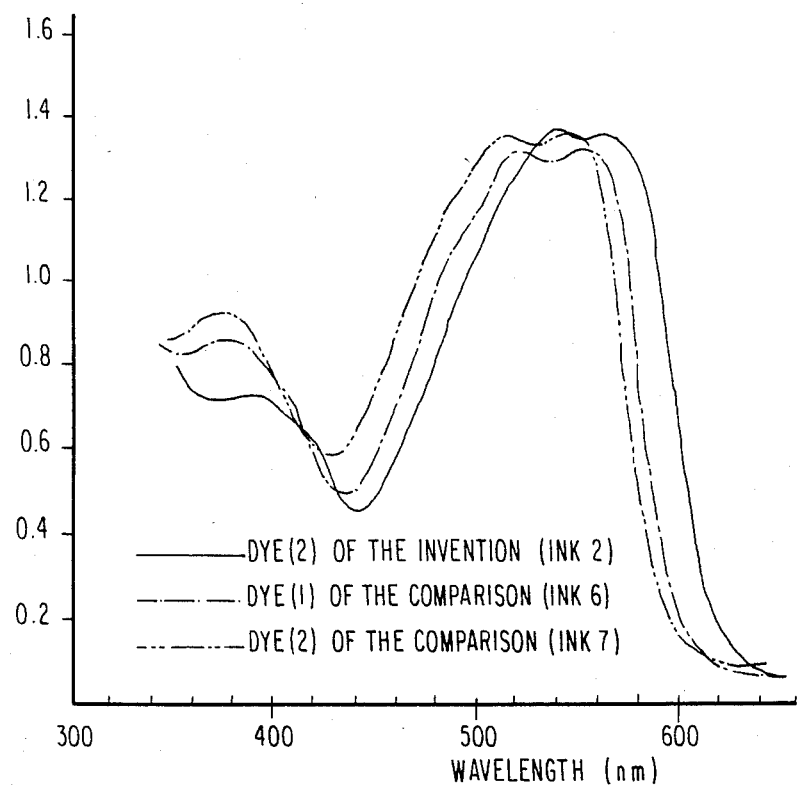

The spectral data of Inks 1 (invention) and 9 and 14 (comparison) are shown in FIG. 1. Further, the spectral data of Inks 2 (invention) and 6 and 7 (comparison) are shown in FIG. 2.

As can be seen from Table 1, the ink compositions incorporating the water-soluble dyes specified in this invention presented much clearer and more excellent hue than ink compositions incorporating known dyes. Such will be further clarified from FIGS. 1 and 2. In other words, the dyes of this invention are sharp in absorption (especially, in a region around 440 nm) and suitable in absorption maximum wavelength. On the other hand, the comparison dyes are short in absorption maximum wavelength, resulting in red images. In addition, the ink compositions of this invention had high storage stability and did not clog the nozzle of the ink-jet printer.

Further, using a yellow ink composition (prepared according to the same formulation as in Example 1 except that the dye of C.I. Acid Yellow-17 was used instead of Dye Example (1)), a cyan ink composition (prepared according to the same formulation as in Example 3 except that the dye of C.I. Direct Blue-86 was used instead of Dye Example (2)) and a black ink composition (prepared according to the same formulation as in Example 3 except that the dye of C.I. Direct Black-38 was used instead of Dye Example (2)) in combination with each of inks 1 to 5 of this invention or each of inks 6 to 15 for comparison, color images were recorded and compared with one another. Color images formed using the combination with the magenta ink compositions of this invention had more faithful color reproduction over an extended region of the visible spectrum, and particularly were excellent in the sharpness of the red color. Moreover, when recording was carried out on fine paper, the dyes of this invention provided much more excellent hue than comparative dyes.

While the invention has been described in detail and with reference to specific embodiments thereof, it will be apparent to one skilled in the art that various changes and modifications can be made therein without departing from the spirit and scope thereof.

What is claimed is:

1. An aqueous ink composition which contains water-soluble dye dissolved in water, said water-soluble dye comprising at least one water-soluble azo dye represented by formula (I)

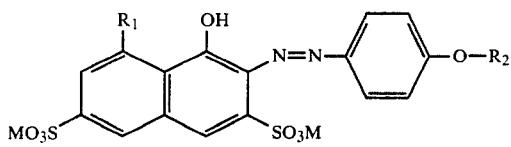

wherein $R_1$ represents an amino group, $R_2$ represents an alkyl group, and M represents a hydrogen atom, an alkali metal, an ammonium group or an organic amine group, wherein the water-soluble dye is incorporated in the ink composition in an amount of from 0.2 to 10 wt% based on the weight of the ink composition.

2. An aqueous ink composition as in claim 1, wherein $R_1$ is an unsubstituted amino group or an amino group substituted with an acyl group, an alkyl group containing from 1 to 4 carbon atoms, or a phenyl group, and $R_2$ is an alkyl group containing from 1 to 4 carbon atoms, or a substituted alkyl group, the alkyl moiety of which contains from 1 to 4 carbon atoms, substituted with a hydroxy group, a chlorine atom, or a phenyl group.

3. An aqueous ink composition as in claim 1, wherein the water-soluble dye is represented by formula (II)

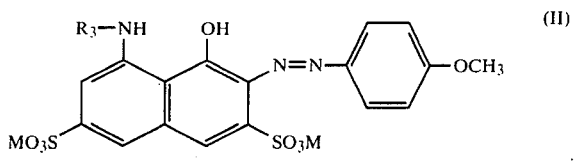

wherein M is the same as defined in claim 1, and $R_3$ is a hydrogen atom, an acyl group or a sulfonyl group.

4. An aqueous ink composition as in claim 3, wherein the sulfo groups in formula (II) are in the form of the alkali metal salts thereof.

5. An aqueous ink composition as in claim 1, wherein the composition additionally comprises a wetting agent in an amount of from 0.2 to 30 wt% based on the weight of the ink composition.

6. An aqueous ink composition for ink-jet printing which contains water-soluble dye dissolved in water, said water-soluble dye comprising at least one water-soluble azo dye represented by formula (I)

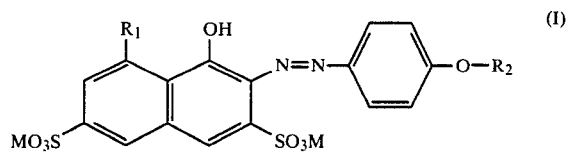

wherein $R_1$ represents an amino group, $R_2$ represents an alkyl group, and M represents a hydrogen atom, an alkali metal, an ammonium group or an organic amine group, wherein the water-soluble dye is incorporated in the ink composition in an amount of from 0.2 to 10 wt% based on the weight of the ink composition.

* * * * *